Figure 1:
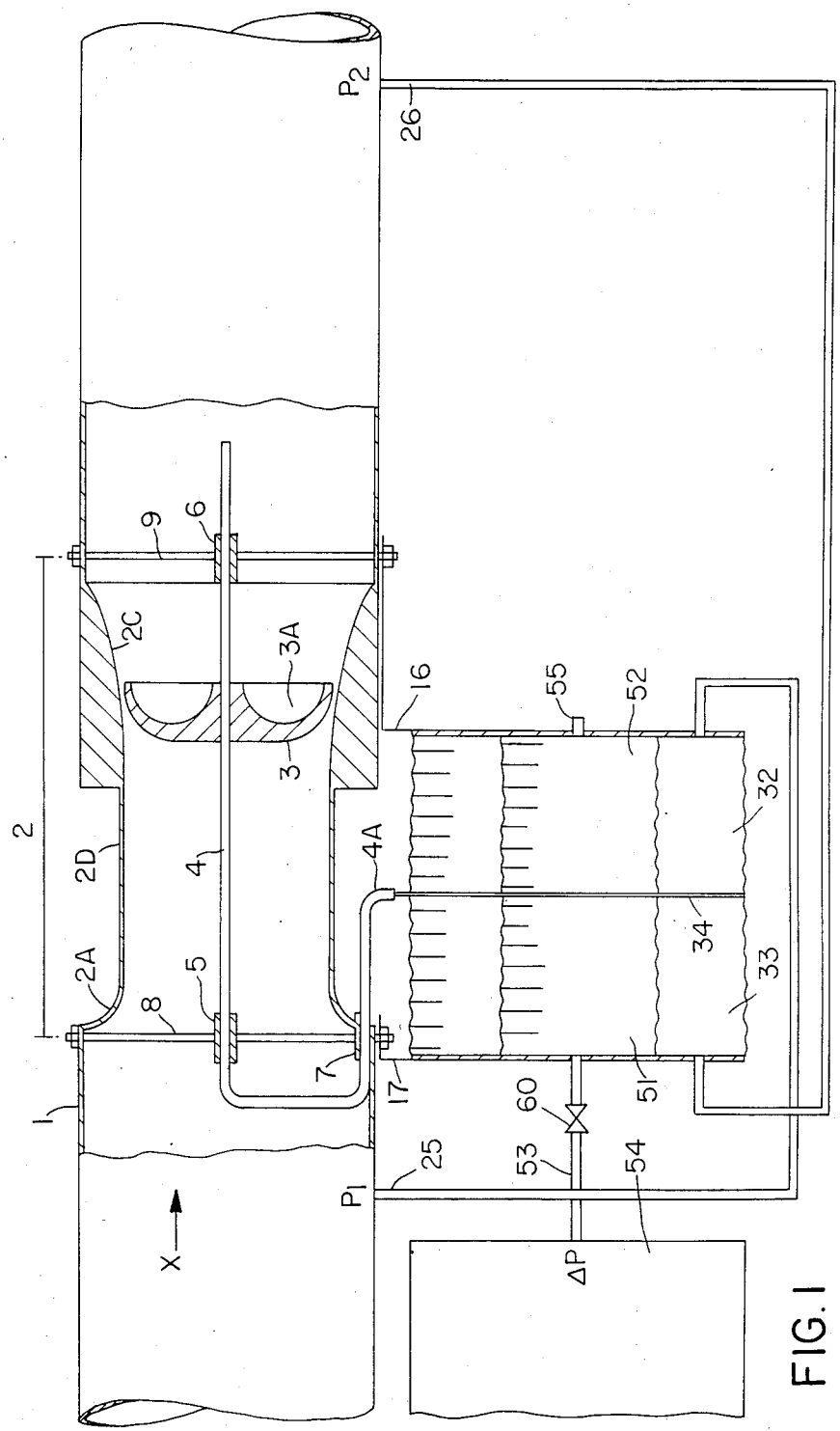

United States Patent [19]

Berglund

[11] Patent Number: 4,637,428
[45] Date of Patent: Jan. 20, 1987

[54] FLUID FLOW CONTROL VALVES

[75] Inventor: Bengt Berglund, Forel, Switzerland

[73] Assignee: Spiro Investment A.G., Boesingen, Switzerland

[21] Appl. No.: 694,756

[22] PCT Filed: May 25, 1984

[86] PCT No.: PCT/GB84/00185
§ 371 Date: Jan. 25, 1985
§ 102(e) Date: Jan. 25, 1985

[87] PCT Pub. No.: WO84/04805
PCT Pub. Date: Dec. 6, 1984

[30] Foreign Application Priority Data

May 26, 1983 [GB] United Kingdom ............. 8314621
Nov. 3, 1983 [GB] United Kingdom ............. 8329333

[51] Int. Cl.$^4$ ............................................. G05D 7/01
[52] U.S. Cl. .................................. 137/503; 137/220; 251/61
[58] Field of Search ............... 137/501, 503, 220; 251/61

[56] References Cited

U.S. PATENT DOCUMENTS

| | | | |
|---|---|---|---|
| 786,667 | 4/1905 | Neumann | 137/503 X |
| 2,399,938 | 5/1946 | Pett | 137/487 |
| 3,554,222 | 1/1971 | Kihara | 137/501 |
| 4,305,418 | 12/1981 | Jensen | 137/219 |

FOREIGN PATENT DOCUMENTS 671395  2/1939  Fed. Rep. of Germany ...... 137/503

Primary Examiner—Robert G. Nilson
Attorney, Agent, or Firm—Sherman and Shalloway

[57] ABSTRACT

A fluid flow control valve which is responsive to the pressure drop occurring across the valve in order to maintain a substantially constant volume of fluid flow regardless of the pressures appearing at the upstream and downstream sides of the valve has a valve casing with an inner face that widens outwardly from a fluid inflow end to a fluid outflow end, and a valve member which is convex towards the fluid inflow end of the casing and is axially movable relatively to the casing in order to vary the annular gap between the valve member and the valve casing. Means for sensing the fluid pressures at points spaced from the valve member on the upstream and downstream sides thereof are coupled to a fluid pressure actuating mechanism for acting directly upon the axially movable valve ember in order to vary the axial position of the valve member in accordance with the pressure drop across the valve. The valve is biased towards its open position by a biasing means presenting a force proportional to the closing movement of the valve member, and the shape of the inner face of the valve casing is so profiled that the coefficient of resistant presented by the valve is directly proportional to the linear closing movement of the valve member. This enables direct adjustment of the valve member in response to the sensed pressure drop, without the requirement for any intermediate control mechanism to compensate for the characteristics of the valve.

5 Claims, 4 Drawing Figures

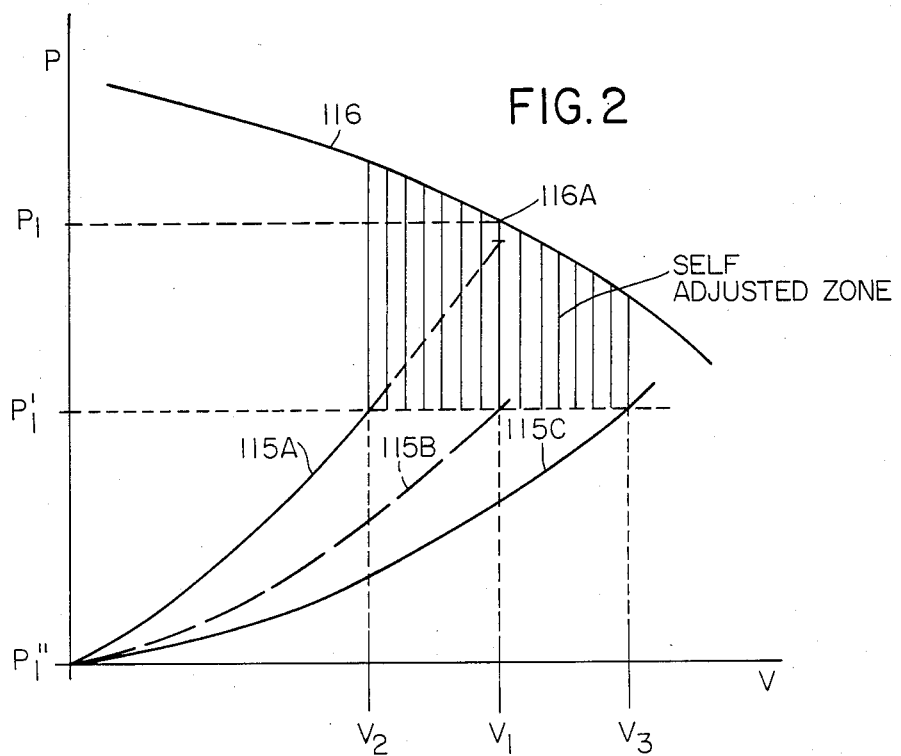
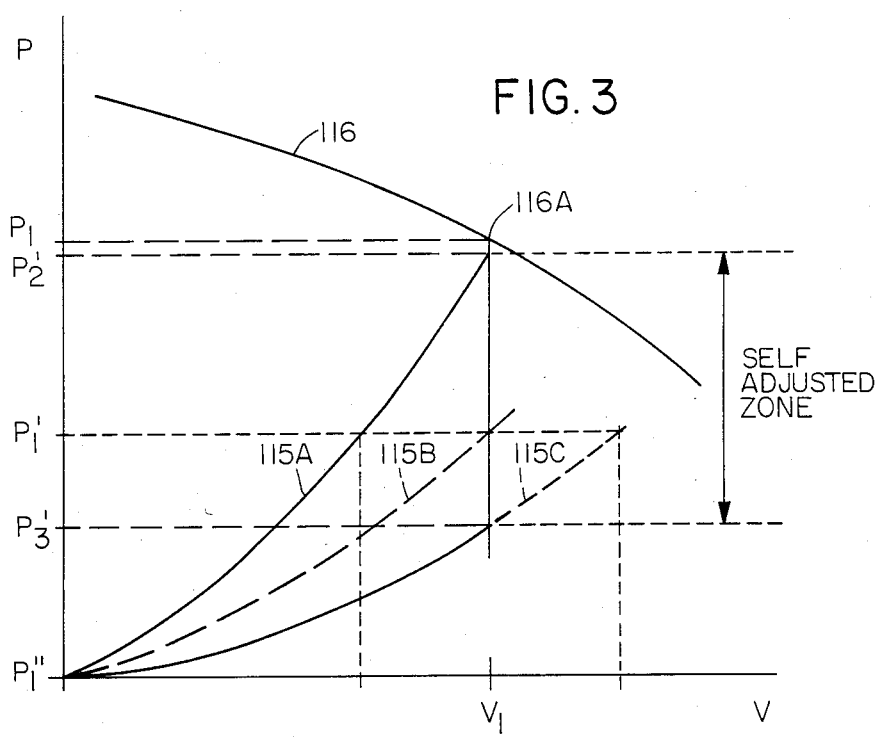

FLUID FLOW CONTROL VALVES

This invention concerns improvements in and relating to fluid flow control valves, and more especially to fluid flow control valves of the kind shown in published European Patent Specification No. 0 007 165.

In the above-mentioned European Patent Specification there is described a fluid flow control valve having a construction such that for any given pressure drop across the valve the volume of air flow to the valve in accordance with the position of the valve member follows a predetermined function. In one embodiment of the valve, the valve is corrected to take account of the so-called β value of a system including a length of ducting arranged between the valve and a source of fluid at constant pressure, whereby the relationship between the position of the valve member and the volume of fluid flow through the valve is substantially linear.

Whilst the above-mentioned arrangement is suitable for the control of fluid flow from a fan or pump which is controlled to operate in such a manner that there is a predetermined pressure drop, or range of pressure drops, across the valve in the various settings of the valve member, such a valve is not able to provide a constant volume of fluid flow in conditions when, at a given setting of the valve member, the pressure drop across the valve is caused to change as a result of changes in the conditions under which the associated fluid flow control system is operating. For example, such changes in pressure drop may occur in a ventilating or air-conditioning system due to changes in the ambient pressure at the air outlet of the system as a result of opening or closing of windows in a room containing the relevant air outlet. A similar variation in pressure drop also occurs as between respective valves in different branches of an air flow system, owing to the different resistances to air flow presented by the corresponding runs of ducting downstream of the control valve. Such a variation in flow resistance may also occur in the same run of ducting, for example as a result of blockage of air filters in the system.

It would accordingly be desirable to provide a fluid flow control valve intended for use in such conditions with a self-adjusting mechanism that is responsive to changes in pressure drop across the valve in such a manner as to allow for changes in the operating conditions thereof and to maintain a constant volume of air flow through the valve.

There is already known, see for example U.S. Pat. No. 3,255,963 a form of fluid flow control valve that is intended to provide a constant volume of flow under varying conditions of supply pressure at the upstream side of the valve. Such a valve comprises a valve member that is spring-loaded in such a manner that it is movable to vary the opening of the valve in resonse to change in the fluid pressure at the upstream side of the valve member. Thus when the supply pressure on the upstream side of the valve member is significantly increased, the valve member is caused to yield against spring-loading in a direction closing the valve, with the object of maintaining a constant fluid flow. Such a valve arrangement has the disadvantage however, that the self-adjustment of the valve is dependent upon the force acting directly on the movable valve member as a result of the pressure on the upstream side of the valve. The setting of the valve is not, therefore, truly representative of the pressure drop across the valve and accurate adjustment of the valve member in such a manner as to maintain a constant fluid flow in the event of changes in ambient pressure on the downstream side of the valve is therefore impossible.

In another form of fluid flow control valve, see for example DE No. 1294254, it has been proposed to control the flow of fluid through the valve in response to the sensing of the pressure differential measured at points upstream and downstream of the valve and to control the position of the valve member accordingly. Such an arrangement uses a simple gate valve arrangement, however, and thus the corresponding turbulence introduced into the fluid in regions close to the valve renders difficult the accurate sensing of the pressure drop across the valve member itself. Moreover, control of the flow of fluid is only possible indirectly, by means of affording compensation for the characteristics of the valve. The arrangement is thus relatively complicated, and accurate correction of the fluid flow is relatively difficult.

It is accordingly one object of the invention to provide an improved fluid flow control valve wherein automatic and accurate adjustment of the valve member can be effected in response to the true pressure drop prevailing across the valve.

The present invention provides a fluid flow control valve comprising a valve casing having an inner face that widens outwardly from a fluid inflow end to a fluid outflow end, and a valve member which is convex towards said fluid inflow end and is axially movable relatively to said casing in order to vary the annular gap between the valve member and the valve casing, characterised in that said valve further comprises means for sensing the fluid pressure at a point spaced from the valve member on the upstream side of the valve member, means for sensing the fluid pressure at a point spaced from the valve member on the downstream side of the valve member and an actuating mechanism for moving the said valve member with respect to the casing in accordance with the difference in the sensed fluid pressures in such a manner that, within at least a given range of such pressure differences the valve member is caused to occupy corresponding positions of equilibrium wherein the volume of flow of fluid through the valve remains at a substantially constant given value.

Preferably, the said actuating mechanism comprises means for biasing said valve member axially with respect to the valve casing in a direction away from the fluid inflow end thereof, a fluid conduit coupled to a duct on the upstream side of said valve member at the said point spaced therefrom, a fluid conduit coupled to a duct downstream of the said valve member at said point spaced therefrom on the downstream side, and a fluid pressure operated actuating means coupled to said respective conduits and arranged to derive from the fluid pressures prevailing in said conduits an actuating force tending to move said valve member against said biasing means.

The said fluid pressure operated actuating means may, for example, comprise type, wherein the opposite sides of a diaphragm are subjected to the respective fluid pressures, or it may com a system of opposed fluid pressure actuators of the bellows or piston and cylinder type.

In a particularly advantageous arrangement, the fluid pressure operated actuator comprises a system of air receivers interlinked by conduits permitting relative motion of the air receivers in such a manner that as a result of the fluid pressures prevailing in said air receivers there is generated a resultant force acting upon the valve member.

The biasing means acting against said fluid pressure operated actuator may also be fluid pressure operated. Such an arrangement is of simple construction and has the particular advantage that the fluid flow control valve may be set to provide a preselected constant volume of fluid flow simply by adjusting the fluid pressure prevailing in the biasing means.

Figure 4:
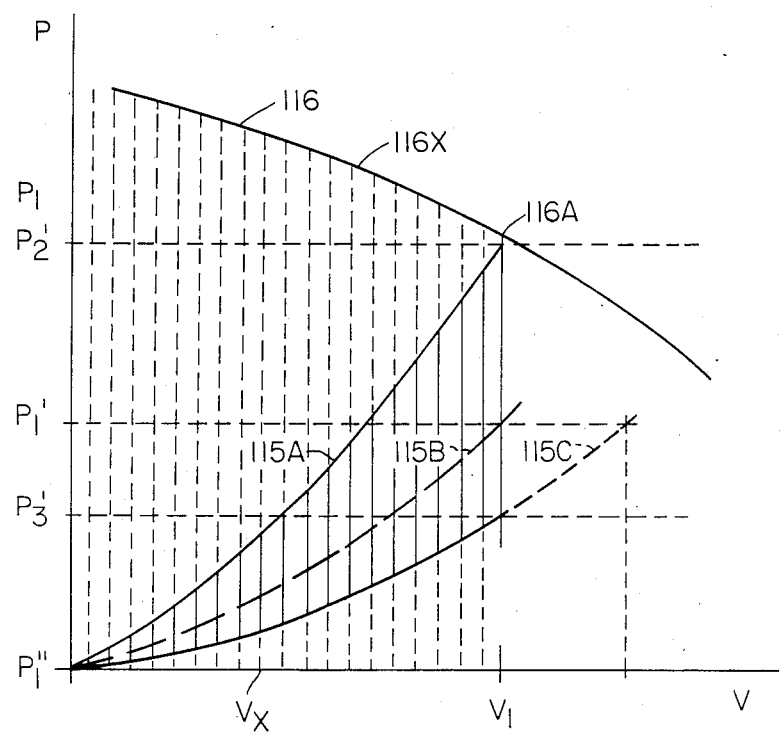

The invention is illustrated by way of example in the accompanying drawings, in which:

FIG. 1 shows a preferred embodiment of the invention,

FIG. 2 is a diagram illustrating the operating parameters of a self-adjusting valve of known type as initially referred to above, FIG. 3 is a similar diagram illustrating the operating parameters of a valve in accordance with one embodiment of the present invention, and FIG. 4 is a further diagram similar to that of FIG. 3 and relating to a valve in accordance with the invention and adapted to provide an adjustable constant volume of fluid flow.

Referring to FIG. 1 of the drawings, the reference numeral 1 indicates a run of ducting within which air is arranged to flow in the direction of the arrow X. Incorporated within the ducting 1 is an air flow control valve of which the casing is indicated generally at 2, and which comprises an upstream end 2A and a downstream end 2B respectively arranged for connection into the run of ducting 1. Between the upstream and downstream ends of the valve casing there is a flared wall portion 2C which widens continuously outwards in a direction away from the upstream end and towards the downstream end of the casing. The portion 2C is defined by a removable hollow conical member which may be interchangeable to enable the characteristics of the valve to be tailored to given requirements by selection of an insert having a corresponding profile. A valve member 3 is arranged coaxially within the flared wall portion 2C, and is mounted for axial movement relatively to the flared portion of the casing, upon a shaft 4. The shaft 4 is axially slidable in sleeves 5 to 7 mounted upon spiders 8 and 9 attached within the upstream and downstream ends of the valve casing, respectively. As shown the shaft 4 extends to the outside of the valve casing 2, and in order to enable a seal to be maintained between the inside and the outside of the valve casing, whilst allowing axial movement of the shaft 4, the latter is formed in a U-shaped configuration of which the respective limbs are guided in the sleeves 5 and 7 located upon the spider 8, the valve casing 2 having a portion 2D of reduced diameter corresponding to the diameter of the inlet end of the flared wall portion 2C, so that the outer limb of the U-shaped portion of the shaft 4 can extend axially along the outside of the valve casing, the sleeve 7 passing through the valve casing and serving to form a seal between the wall of the casing and the shaft 4.

The free end of the outer limb of the shaft 4 has a turned over end 4A which engages with an actuating mechanism in order to enable adjustment of the axial position of the valve member 3, as described below.

The fluid flow control valve operates in a manner which is essentially similar to that described in European Patent Specification No. 0 007 165, with the exception that the presence of the section 2D of the valve casing allows direct mechanical adjustment of the axial position of the valve member 3 by way of the shaft 4, and that the construction of the flared wall 2C of the valve casing as part of a removable hollow conical member allows exchange of the conical member to provide for utilisation of wall surfaces 2C of differing shape to facilitate the adjustment of the characteristics of the valve device to meet different working conditions. In addition, the valve member 3 is provided with an annular semi-circular recess 3A at its rear surface, in order to promote the flow of eddy currents in the fluid at the rear side of the valve member. A pair of oppositely acting bellows 32 and 33 are respectively linked to the conduits 25 and 26, the opposite outer faces of the bellows 32 and 33 being fixed whereas the central boundary 34 between them moving together with the shaft 4 at 4A in response to the pressure differential across the valve. The opposed bellows 32 and 33 are of annular construction and are arranged to surround two further collapsible bellows 51 and 52 of cylindrical configuration. The bellows 51 is coupled via a conduit 53 to a source 54 of regulated pneumatic pressure between the source of fluid pressure 54 and the bellows 51 there is provided in the conduit 53 a shut-off valve 60. The interior of the bellows 52 is coupled directly to atmosphere via a conduit 55, and thus the two opposed bellows 51 and 52 serve to provide a biasing means biasing the valve member 3 towards the open direction with a force dependent upon the difference in fluid pressures prevailing in the respective bellows 51 and 52. During operation of the valve at a given setting of a selected volume of air flow, the shut-off valve 60 is closed. Assuming that the ambient atmospheric pressure remains substantially constant, the biasing means thus presents a force biasing the valve member 3 towards its fully open position which is determined by the pressure selected for the air within the bellows 51 in its fully relaxed position, i.e. with the valve fully open, and upon the state of compression of the bellows. The bellows 51 thus acts as an adjustable air spring of which the spring rate can be selected by setting the regulated pressure within the source 54 prior to closure of the valve 60. In practice this can be achieved in a simple manner by adjusting the pressure in the source 54 so that the valve is fully open when the pressure drop sensed across the valve by conduits 25 and 26 is at the minimum value that will occur in use.

A comparison of the operating characteristics of the valve in accordance with the present invention, in relation to that of the prior art, can be seen from FIGS. 2 and 3, each of which show graphs wherein the volume of fluid pressure shown on the abscissa is plotted against fluid pressure shown on the ordinate. In the lower part of each diagram, the curves 115A, 115B and 115C represent resistance curves of various branches of a fluid distribution system such as a ventilating or air conditioning system, which respectively present different resistances to fluid flow. For example, curve 115A represents the resistance curve of a run of ducting presenting a higher resistance to fluid flow, for example because of a greater length of ducting, or blockage of air filters present in the ducting, curve 115B indicates the resistance curve of a branch in the system presenting a normal resistance to fluid flow, and curve 115C is a curve representing the resistance of a branch of the system presenting a lower resistance to fluid flow. The curve 116 represents the so-called fan chart of the fan of an air conditioning or ventilating system, illustrating the variation in air supply pressure at the outlet of the fan as a function of the volume of flow of air through the fluid flow control valve.

Thus, it will be seen that for any given volume of fluid flow through the fluid flow control valve there will be a corresponding total pressure drop across the system including the valve and the associated run of ducting, the total pressure drop being indicated by the distance along the axis of the ordinate between the curve 16 and the abscissa. The corresponding distance between the curve 116 and each of the curves 115A, 115B and 115C indicates the proportion of the total pressure drop that occurs across the fluid flow control valve and the distances between the respective curves 115A, 115B and 115C and the abscissa respectively indicate the proportion of the pressure drop due to the resistance in the ducting downstream of the outlet from the fluid flow control valve.

Thus, referring to FIG. 2, which illustrates the operation of the known type of valve with a spring loaded valve member, it will be seen that when the valve is set to give a predetermined volume of flow of air indicated at V1 through a run of ducting having the resistance curve 115B, the total pressure drop across the valve and the ducting is indicated at point 116A of curve 116, corresponding to an air supply pressure P1 from the fan. The proportion of the total pressure drop that occurs within the run of ducting itself is indicated by the point at which the line between the value V1 on the abscissa and the point 116A on curve 116 intersects the curve 115B. The ambient atmospheric air pressure at the outlet of the run of ducting is indicated at P1″, and thus the total pressure drop in the system comprising the valve and ducting is given by P1−P1″, the pressure drop across the valve corresponding to P1−P1′ and the pressure drop across the ducting to P1−P1″. For a given supply pressure provided by the fan, the relation between the specified pressure drops will remain constant, assuming that the resistance to air flow on the downstream side of the valve also remains constant, and will be a function of the force of the spring loading the valve member, and the corresponding position adopted by the valve member in response to the fluid pressure on the upstream side of the valve. However, if the resistance presented on the downstream side of the valve should change, for example in such a manner that the ducting presents an increased resistance represented by curve 115A, the proportion of the total pressure drop occurring across the run of ducting will increase in relation to that occurring across the control valve. For a given setting of the valve member the volume of air flow through the valve will therefore be reduced. Since the setting of the valve is determined solely by the pressure on the upstream side of the valve member, the position of the valve member cannot change to compensate for the change in resistance on the downstream side thereof. In order to compensate for such a change in the overall resistance presented by the system, it would be necessary for the valve member to open and thereby increase the volume of flow through the valve. In actual fact it will be seen that, as a result of the characteristics of the fan curve 116, the pressure on the upstream side of the valve member will actually increase as the volume of flow through the valve is reduced and thus the valve member will be caused to close against its return spring, thereby adjusting the valve in the opposite sense from that required. Thus, when the resistance presented by the ducting corresponds to that of curve 115A, it will be seen that the system reaches a position of equilibrium wherein the resistance to air flow presented by the fluid flow control valve is increased in proportion to that presented by the ducting, and the volume of air flow through the system is reduced to a value indicated at V2.

If, on the other hand, the resistance presented by the run of ducting is reduced, as indicated by the resistance curve 115C, it will be seen that as a result of this reduced resistance the volume of fluid flow through the system will tend to increase, and at the same time the fan pressure will tend to decrease, so that the valve member will open under its spring loading to reduce the resistance presented by the valve in relation to that presented by the ducting. The corresponding result will be that the system reaches a condition of equilibrium giving an increased volume of flow V3.

Thus, it will be seen that in the case of the known valve construction, a variation in the resistance to flow presented by the ducting in which the valve is incorporated will cause a corresponding change in the volume of air flow that cannot be compensated by the automatic mechanism of the valve. Thus, a disadvantage of the known valve construction is that a valve of given construction and volume setting cannot be incorporated in different branches of an air distribution system presenting different coefficients of resistance to air flow and provide control of the same volume of air flow in each case. A more important disadvantage is that variation in the resistance to flow of air on the downstream side of the valve that may occur in practice in the same run of ducting cannot be compensated by the valve, so that the volume of air delivered by the valve will fluctuate in response to such variations in the operating conditions of the system. Such a change in operating conditions may occur in particular when a window of a room served by the ducting is opened, thus changing the value of the ambient air pressure P1″.

Referring to FIG. 3, the corresponding actuation of a valve in accordance with the present invention is illustrated under the same conditions as outlined above. As in the case of the known valve, with ducting having a normal coefficient of resistance indicated by curve 115B, the parameters for a given volume of flow V1 will be the same as indicated in FIG. 2.

In the case of the valve of the present invention, however, as described above the position of the valve member 3 is determined as a result not only of the pressure on the upstream side of the valve member 3, but as a result of the pressure drop across the valve itself. Thus, when the resistance presented by the ducting is given by the curve 115B, the valve member 3 will be urged in the closing direction under a force proportional to the pressure drop P1−P1′, and will reach a corresponding position of equilibrium at which the volume of flow equals V1. Assuming that the resistance presented by the ducting is increased in accordance with curve 115A, the volume of flow through the valve will tend to be reduced, but as a result of a corresponding reduction in the pressure drop across the valve the force biasing the valve member 3 towards the closed position will be reduced and thus, despite any corresponding increase in supply pressure on the upstream side of the valve, the valve member will open. A new position of equilibrium will therefore be reached at which the pressure drop across the valve corresponds to P1−P2′, the valve member being opened to such an extent that this pressure drop is very small in relation to that in the ducting and the overall volume of flow remains the same. Correspondingly, in the event of a decrease in the resistance presented by the ducting as indicated by curve 115C, the volume of flow of air through the valve will tend to be increased, but the corresponding increase in pressure drop across the valve will tend to close the valve member 3, so that once again a position of equilibrium is reached wherein the position of the valve member in response to the pressure drop P1−P3' will once again give the same volume of air flow V1.

Thus, it will be seen that in accordance with the present invention there is provided a valve construction which not only will provide the same controlled volume of flow of air when incorporated in runs of ducting having different coefficients of resistance to air flow, but will also maintain a constant delivery of air in conditions when the ambient atmospheric air pressure in the room served by the ducting is varied, for example by opening and closing of a window of the room.

It will be noted that in order for an air flow control valve in accordance with the invention always to reach a position of equilibrium giving a constant volume of flow under the varying operating conditions illustrated in FIG. 3, the value of the force provided by the means biasing the valve member 3 in the open direction must be such as to provide for the appropriate setting of the valve member in response to each pressure drop that will in use occur across the valve. Thus, assuming that the biasing means provided by the bellows 51 of FIG. 1 provides a biasing force that varies linearly with the movement of the valve member 3, so that the position of the valve member, starting from the fully open position of the valve, is inversely proportional to the differential pressure sensed across the valve, it will be seen that the valve defined by the portion 2C and the valve member 3 must have a characteristic such that the variation in drag coefficient is directly proportional to the linear movement of the valve member 3 from the open position towards the closed position. The characteristics of the valve defined by the profile of the portion 2C thus do not correspond directly with the characteristics of the valve as described in the above-mentioned European Patent Specification No. 0 007 165, since in the latter case the valve as specifically described was intended to have a characteristic such that the volume of air flow through the valve was directly proportional to the linear movement of the valve member, the volume of flow in that case being proportional to the square root of the pressure drop across the valve. However, the profile of the portion 2C required to provide the desired function can be derived by the same process as described in European Patent Specification No. 0 007 165.

Although the operation of the fluid flow control valve in accordance with the invention has been described above with reference to FIG. 3 on the assumption that the biasing means is set to provide a predetermined constant volume of fluid flow under the varying operating conditions of the valve, it will be appreciated that, as described above, a variation in the biasing force provided by the relevant biasing means can be utilised in order to effect an optional adjustment of the volume of fluid flow through the valve, for example as a result of a change in the demand for the supply of air via an air conditioning or ventilating system to a given room of premises served by the system. Referring to FIG. 4, wherein the same reference numerals have the same meaning as in the case of FIGS. 2 and 3, it will be appreciated that any desired constant volume of flow through the valve $V_X$ can be obtained by varying the relationship between the pressure drop that occurs across the fluid flow control valve and the pressure drop that occurs across the ducting as defined by the corresponding operating curve 15A, B or C. Such a change can be effected, for example, by reducing the force applied by the biasing means to the valve member 3, so that the valve member 3 moves towards the closed position and a new position of equilibrium of the valve is reached at which the air supply fan operates on a different point 116X of its characteristic curve and a correspondingly reduced volume $V_X$ of air is caused to flow through the valve. Once the new position of equilibrium of the valve has been reached, the valve operates to maintain the newly selected constant volume $V_X$ of air under varying operating conditions of the valve as already described above.

Accurate adjustment of the valve in the manner described above can be effected in a particularly advantageous manner by means of the device as shown in FIG. 1, since the variation in biasing force can be effected very simply by controlling the initially set gas pressure within the diaphragm 51 with the aid of the regulatable pressure source 54, and then closing the diaphragm by means of the valve 60.

The arrangement of FIG. 1 also has the particular advantage that the bellows 51 can provide any desired spring rate more easily and accurately than could be achieved by the replacement of springs, particularly since the design of a conventional helical coil spring to provide the appropriate spring characteristics is relatively complicated.

This may also be of importance when the force presented by the biasing means must be adjusted in accordance with the relationship between the air supply pressure provided on the upstream side of the valve and the desired volume of air flow, and thus may, in use, require adjustment in the case of an air distribution system of the so-called variable volume type, wherein the valve may be required to give a constant volume of flow under conditions of varying air supply pressure.

What is claimed is:

1. A fluid control valve for connection into a run of ducting having a predetermined cross-sectional area, said valve including:
 (a) a valve casing having an inner face including an inlet region of substantially uniform cross-sectional area, a tapered region tapering outwardly from said inlet region to an outlet region;
 (b) a valve member having a valve head convex in a direction toward said inlet region and axially movable within said tapered region to vary the annular gap between said valve head and said tapered region;
 (c) actuator means for actuating said valve member comprising:
  (i) first and second expansible chambers joined by a common movable wall;
  (ii) a first sensing conduit fluidly connecting a location upstream of said valve member with said first expansible chamber;
  (iii) a second sensing conduit fluidly connecting a location downstream of said valve member with said second expansible chamber;
  (iv) a mechanical linkage connecting said valve member with said movable wall;

(v) biasing means comprising at least one further expansible chamber arranged coaxially with said first and second expansible chambers and coupled thereto, said at least one further expansible chamber being charged with fluid having a predetermined pressure at a given state of compression of said at least one further expansible chamber;

(vi) whereby said actuator means adjustably controls the position of said valve head to maintain substantially constant fluid flow regardless of the pressure drop across said valve head.

2. The invention of claim 1, wherein said first and second expansible chambers each comprise a bellows.

3. The invention of claim 2, wherein said biasing means comprises a further bellows.

4. The invention of claim 3, wherein said bellows comprising said expansible chambers are annular in shape, each having a central opening therethrough, and said further bellows is contained within at least one of said central openings.

5. The invention of claim 1, wherein said at least one further expansible chamber comprises a third expansible chamber charged with fluid at a predetermined pressure and a fourth expansible chamber vented at the atmosphere.

* * * * *

UNITED STATES PATENT AND TRADEMARK OFFICE
CERTIFICATE OF CORRECTION

PATENT NO. : 4,637,428
DATED : January 20, 1987
INVENTOR(S) : BENGT BERGLUND

It is certified that error appears in the above-identified patent and that said Letters Patent is hereby corrected as shown below:

IN THE CLAIMS

Claim 5, line 4, (column 10, line 13),
delete "at", insert --to--.

Signed and Sealed this

Thirty-first Day of March, 1987

Attest:

DONALD J. QUIGG

*Attesting Officer*     *Commissioner of Patents and Trademarks*